(12) United States Patent
Strand (10) Patent No.: US 9,648,898 B2
(45) Date of Patent: May 16, 2017

(54) METERING THE DISPOSITION OF A FOOD PRODUCT INTO CAVITIES FORMING A PELLET

(75) Inventor: Aaron Strand, Plymouth, WI (US)

(73) Assignee: Kerry Luxembourg S.à.r.l., Luxembourg (LU)

( * ) Notice: Subject to any disclaimer, the term of this patent is extended or adjusted under 35 U.S.C. 154(b) by 1121 days.

(21) Appl. No.: 13/614,986

(22) Filed: Sep. 13, 2012

(65) Prior Publication Data

US 2014/0072688 A1    Mar. 13, 2014

(51) Int. Cl.
| | | |
|---|---|---|
| A23L 3/36 | (2006.01) | |
| A23L 1/39 | (2006.01) | |
| F25D 13/06 | (2006.01) | |
| F25D 25/04 | (2006.01) | |
| A23L 3/375 | (2006.01) | |
| A23P 30/10 | (2016.01) | |
| A23L 23/00 | (2016.01) | |

(52) U.S. Cl.
CPC ........ *A23L 1/39* (2013.01); *A23L 3/36* (2013.01); *A23L 3/375* (2013.01); *A23L 23/00* (2016.08); *A23P 30/10* (2016.08); *F25D 13/06* (2013.01); *F25D 25/04* (2013.01)

(58) Field of Classification Search
CPC . A23G 9/06; A23G 9/18; A23G 9/282; A23G 9/48; A23G 9/221; A23L 1/0079; A23L 1/0073; A23P 1/105; A23P 1/1086; A23P 1/125
See application file for complete search history.

(56) References Cited

U.S. PATENT DOCUMENTS

| | | | |
|---|---|---|---|
| 1,998,431 A | 4/1935 | Birdseye | |
| 2,021,047 A | 11/1935 | Chilton | |
| 2,365,349 A * | 12/1944 | MacManus | A21B 3/132 426/27 |
| 2,582,074 A | 1/1952 | Sebring | |

(Continued)

FOREIGN PATENT DOCUMENTS

JP    2004132654 A  *  4/2004  ............... A23G 9/06

OTHER PUBLICATIONS

English translation JP 2004132654; Sekida; Oct. 11, 2002; pp. 1-13.*

(Continued)

*Primary Examiner* — Steven Leff
(74) *Attorney, Agent, or Firm* — Sughrue Mion, PLLC (57) ABSTRACT

A process for metering the disposition of a food product into cavities forming a pellet. The cavities are defined in a conveyor as individual cavities. Each cavity defines a specific volume. The process includes supplying a quantity of food product in a supply chamber which includes a plurality of nozzles aligned above the conveyor. The nozzles are aligned with a predetermined portion of the cavities. A predefined supply of food product is dispensed and metered through each nozzle. The food product is dispensed through the nozzles into the cavities without exceeding the specific volume of the cavity. The food product is frozen into an individual quick frozen pellet starting immediately upon disposition in one of the cavities. The step of metering the predefined amount of food product includes metering a predetermined weight of the food product.

12 Claims, 6 Drawing Sheets

(56) References Cited

U.S. PATENT DOCUMENTS

| | | | | |
|---|---|---|---|---|
| 2,664,592 | A | * | 1/1954 | Ingraham .............. B65G 17/067 164/329 |
| 2,751,687 | A | | 6/1956 | Colton |
| 2,850,051 | A | | 9/1958 | Rasmusson |
| 2,865,310 | A | * | 12/1958 | Murray ................ A23G 3/0263 426/515 |
| 2,866,420 | A | | 12/1958 | Nutty |
| 2,949,639 | A | * | 8/1960 | Woodward .............. B29C 51/22 264/280 |
| 3,285,029 | A | | 11/1966 | Pansing |
| 3,402,568 | A | * | 9/1968 | Kamin .................. F25D 13/062 165/86 |
| 3,477,393 | A | | 11/1969 | Bell et al. |
| 3,771,322 | A | | 11/1973 | Betschart |
| 3,809,774 | A | * | 5/1974 | Raitt ........................ A23G 9/14 264/251 |
| 3,860,057 | A | * | 1/1975 | Garlick ................ B22D 11/066 164/431 |
| 4,044,161 | A | | 8/1977 | Tanara |
| 4,068,993 | A | * | 1/1978 | Dacey ...................... A23G 3/18 425/104 |
| 4,088,249 | A | | 5/1978 | Westling |
| 4,111,272 | A | | 9/1978 | Ricciardi et al. |
| 4,315,885 | A | * | 2/1982 | Lemelson .......... A44B 18/0049 264/297.3 |
| 4,335,583 | A | | 6/1982 | Billett |
| 4,418,085 | A | | 11/1983 | Bicquelet |
| 4,507,326 | A | | 3/1985 | Tarantino |
| 4,530,214 | A | * | 7/1985 | Ellsworth ............... A23G 9/221 62/345 |
| 4,548,573 | A | * | 10/1985 | Waldstrom ............... A23G 9/26 425/126.2 |
| 4,714,419 | A | | 12/1987 | Nielsen |
| 4,715,275 | A | | 12/1987 | Getman |
| 4,832,970 | A | | 5/1989 | Mally et al. |
| 5,073,379 | A | * | 12/1991 | Klimesch .................. A61J 3/10 424/400 |
| 5,199,269 | A | | 4/1993 | Andersson |
| 5,208,059 | A | | 5/1993 | Dubowik et al. |
| 5,279,842 | A | * | 1/1994 | Escola Gallart ..... A23G 3/0284 426/103 |
| 5,394,707 | A | * | 3/1995 | Miller ...................... A23G 9/18 62/345 |
| 5,458,055 | A | | 10/1995 | Fitch, Jr. |
| 5,520,013 | A | * | 5/1996 | Kuo ........................ A23L 3/001 62/378 |
| 5,733,587 | A | * | 3/1998 | Ream ................... A23G 3/0236 425/144 |
| 6,012,293 | A | * | 1/2000 | Andersson ........... A23G 3/0273 62/345 |
| 6,216,472 | B1 | | 4/2001 | Cathenaut et al. |
| 6,355,288 | B1 | | 3/2002 | DiGiacomo |
| 6,408,639 | B1 | * | 6/2002 | Jagaeus ................ B65G 17/067 62/345 |
| 6,534,106 | B2 | | 3/2003 | Cathenaut et al. |
| RE38,478 | E | | 3/2004 | Fitch, Jr. et al. |
| 7,040,974 | B2 | * | 5/2006 | Shefet .................. A22C 11/001 452/35 |
| 7,182,683 | B2 | * | 2/2007 | Shefet .................. A22C 11/001 452/30 |
| 7,658,958 | B2 | | 2/2010 | Hansen |
| 7,814,754 | B2 | | 10/2010 | Hermansen |
| 7,819,053 | B2 | | 10/2010 | Kaiser et al. |
| 7,820,218 | B2 | * | 10/2010 | Suttle ................... A23G 1/0063 426/389 |
| 7,955,066 | B2 | * | 6/2011 | Takeuchi ................. A23G 1/22 249/92 |
| 8,083,976 | B2 | * | 12/2011 | Lengsfeld ............. B29C 70/504 156/199 |
| 8,409,650 | B2 | | 4/2013 | Pasini Bertran |
| 2002/0152764 | A1 | * | 10/2002 | Berghoff ................. A23L 3/362 62/380 |
| 2003/0131624 | A1 | | 7/2003 | Rasmussen et al. |
| 2005/0161855 | A1 | * | 7/2005 | Brown ................... B29C 43/22 264/166 |
| 2006/0051475 | A1 | | 3/2006 | Fornaguera et al. |
| 2009/0061059 | A1 | | 3/2009 | Jarvis et al. |
| 2009/0120107 | A1 | | 5/2009 | Oztas et al. |
| 2010/0139293 | A1 | | 6/2010 | Maccise Sade et al. |
| 2010/0303979 | A1 | * | 12/2010 | Massa .................. A23G 1/0093 426/389 |

OTHER PUBLICATIONS

Communication dated Jun. 1, 2015, issued by the U.S. Patent and Trademark Office in U.S. Appl. No. 13/614,868.
Communication dated Nov. 14, 2014, issued by the U.S. Patent and Trademark Office in U.S. Appl. No. 13/614,868.
Communication dated Sep. 5, 2014, issued by the U.S. Patent and Trademark Office in U.S. Appl. No. 13/614,868.
Communication dated Jan. 22, 2014, issued by the U.S. Patent and Trademark Office in U.S. Appl. No. 13/614,868.
Communication dated Nov. 29, 2013, issued by the U.S. Patent and Trademark Office in U.S. Appl. No. 13/614,868.
Communication dated Jan. 22, 2014, issued by the U.S. Patent and Trademark Office in U.S. Appl. No. 13/251,722.
Communication dated Nov. 4, 2013, issued by the U.S. Patent and Trademark Office in U.S. Appl. No. 13/251,722.
Communication dated Aug. 5, 2013, issued by the U.S. Patent and Trademark Office in U.S. Appl. No. 13/251,722.
Communication dated May 30, 2013, issued by the U.S. Patent and Trademark Office in U.S. Appl. No. 13/251,722.

* cited by examiner

METERING THE DISPOSITION OF A FOOD PRODUCT INTO CAVITIES FORMING A PELLET

BACKGROUND OF THE INVENTION

Field of the Invention

The present invention generally relates to the process for making individual quick frozen pellets composed of a food product. More specifically, the invention relates to providing a portion control fill of cavities in a mold to a specific desired weight and quick freezing each individual food product in the cavity into a pellet.

It is known that various styles of freezing apparatus exists for the creation of sauce pieces frozen from a liquid form. The sauces typically are composed of cheese, vegetables, and various meats in a consistency for food disposition. Some of the freezing apparatus utilize a flat belt onto which specific amounts of sauce are deposited and frozen. Other apparatus use a series of plates or trays that define molded cavities into which a fluid product is filled. Still further apparatus include a conveyor that itself defines cavities into which the liquid sauce is deposited and frozen.

In a typical operation, the liquid food product is in a open-ended box that sits above a conveyor containing the molds and allows the liquid product to flow into the molds by gravity. The edges of the box then scrape off most of the excess food product with a controlled amount of flash existing between individual frozen pieces. Such flash constitutes waste and such wasted food product may or may not be reusable depending on the particular apparatus and process involved. The cavities filled with the food product is then frozen either in a cryogenic process or more typically in a refrigeration tunnel associated with the filling apparatus.

The process and system of the present invention must also be of construction which is both durable and long lasting, and it should also require little or no maintenance to be provided by the user throughout its operating lifetime. In order to enhance the market appeal of this disclosure, the system should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present disclosure.

There is provided a process for metering the disposition of a food product into cavities for forming a pellet. The cavities are defined in an endless conveyor as individual cavities. The endless conveyor includes an upper portion and a lower portion. Each cavity defines a specific volume and is a two-part structure. An upper endless conduction bar conveyor and a lower endless conduction bar conveyor are aligned with and in contact with the upper portion and lower portion, respectively, of the endless conveyor.

The process includes supplying a quantity of food product in a supply chamber with the supply chamber including a plurality of nozzles aligned above the endless conveyor. The temperature of the endless conveyor, the lower endless conduction bar conveyor and the upper endless conduction bar conveyor are reduced to a predetermined temperature in a cryogenically refrigeration apparatus. The plurality of nozzles are aligned with a predetermined portion of the cavities.

A predefined amount of the supply of food product dispensed and metered through each nozzle. The food product is dispensed through one of the nozzles into one of the cavities without exceeding the specific volume of the cavity. The food product is frozen into an individual quick frozen pellet. All surfaces of the food product are quick frozen starting immediately upon contact of the upper endless conduction bar conveyor with one of the cavities in the endless conveyor. The step of metering the predefined amount of food product includes metering to include a predetermined weight of the food product.

In another embodiment, the process for metering the disposition of the food product includes supplying a second quantity of food product in a second supply chamber having a second plurality of nozzles. The second plurality of nozzles are aligned with the predetermined portion of cavities with the second predefined amount of food product metered and dispensed through each of the second plurality of nozzles into the predetermined portion of the cavities on top of the previously dispensed food product.

It is further provided a system to meter the disposition of the food product into an individual quick frozen pellet. The system includes an endless conveyor, with the conveyor including cavities, with each cavity defining a specific volume and further defined by a two-part structure. A quick freeze apparatus is coupled to the endless conveyor and to an upper and a lower endless conduction bar conveyors and configured to freeze material defining the cavities as the endless conveyor moves through the apparatus and to freeze the conduction bars of the upper and lower endless conduction bar conveyor. The cavities can be defined in a tray which is supported by and moved by the endless conveyor, or the cavities can be defined in the endless conveyor itself.

The system further includes a supply chamber configured to hold a supply of the food product. The supply chamber includes a plurality of nozzles positioned above the conveyor and aligned with a predetermined portion of the cavities. The nozzles are configured to dispense the food product into the predetermined portion of the cavities without exceeding the individual, specific volume of such cavities and the dispensed food product is frozen starting immediately upon disposition in the cavities.

In another embodiment, the system to meter the disposition of the food product into individual quick frozen pellets further includes a second quantity of food product in a second supply chamber. The second supply chamber is in communication with the plurality of nozzles, aligned above the endless conveyor with the plurality of nozzles configured to dispense both quantities of food product simultaneously through the same plurality of nozzles into the predetermined portion of cavities.

DESCRIPTION OF THE DRAWINGS

These and other advantages of the present invention are best understood with reference to the drawings, in which.

DETAILED DESCRIPTION OF THE EXEMPLARY EMBODIMENTS

There is disclosed a processing system for metering the disposition of a food product into cavities for forming an individual quick frozen pellet. The process and system provides a portion controlled fill to cavities 110 moving on a conveyor 106 underneath a plurality of nozzles 104, with the nozzles coupled to at least one food product supply chamber 102. The schematic of the system illustrated in FIG. 1 for the system for metering the disposition of food product 100 illustrates a food product supply chamber 102 which includes a plurality of nozzles 104. Each nozzle is in communication with the supply chamber 102 and it is through each nozzle that the portion control of food product is deposited into a predetermined portion of cavities 120 of a corresponding plurality of cavities 110.

Figure 1:
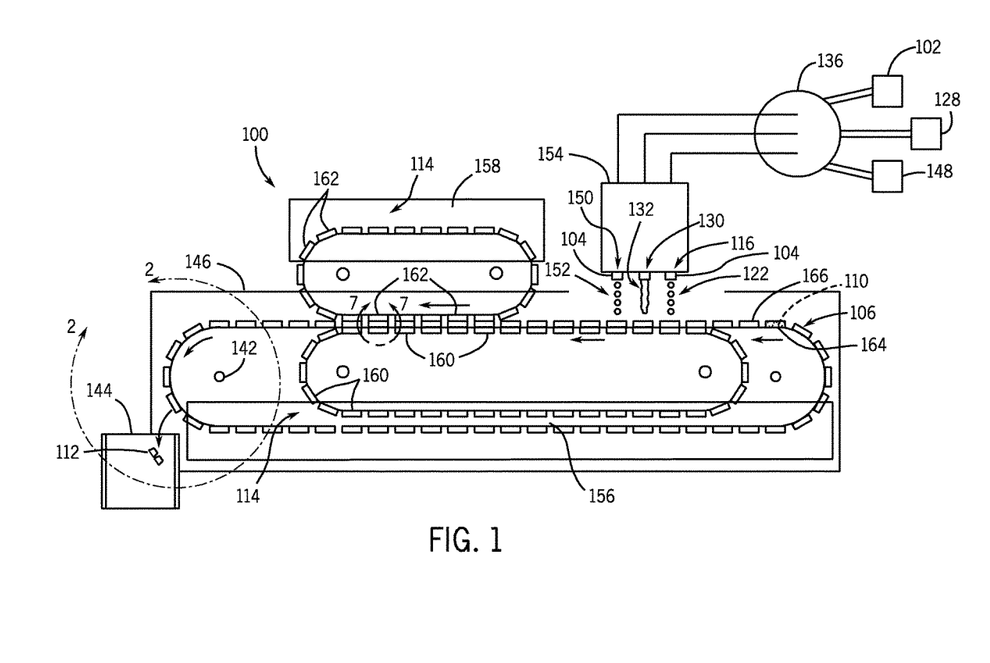
FIG. 1 is a schematic side plan view of a system to meter the disposition of a food product into an endless conveyor creating individual quick frozen pellets.
Figure 2:
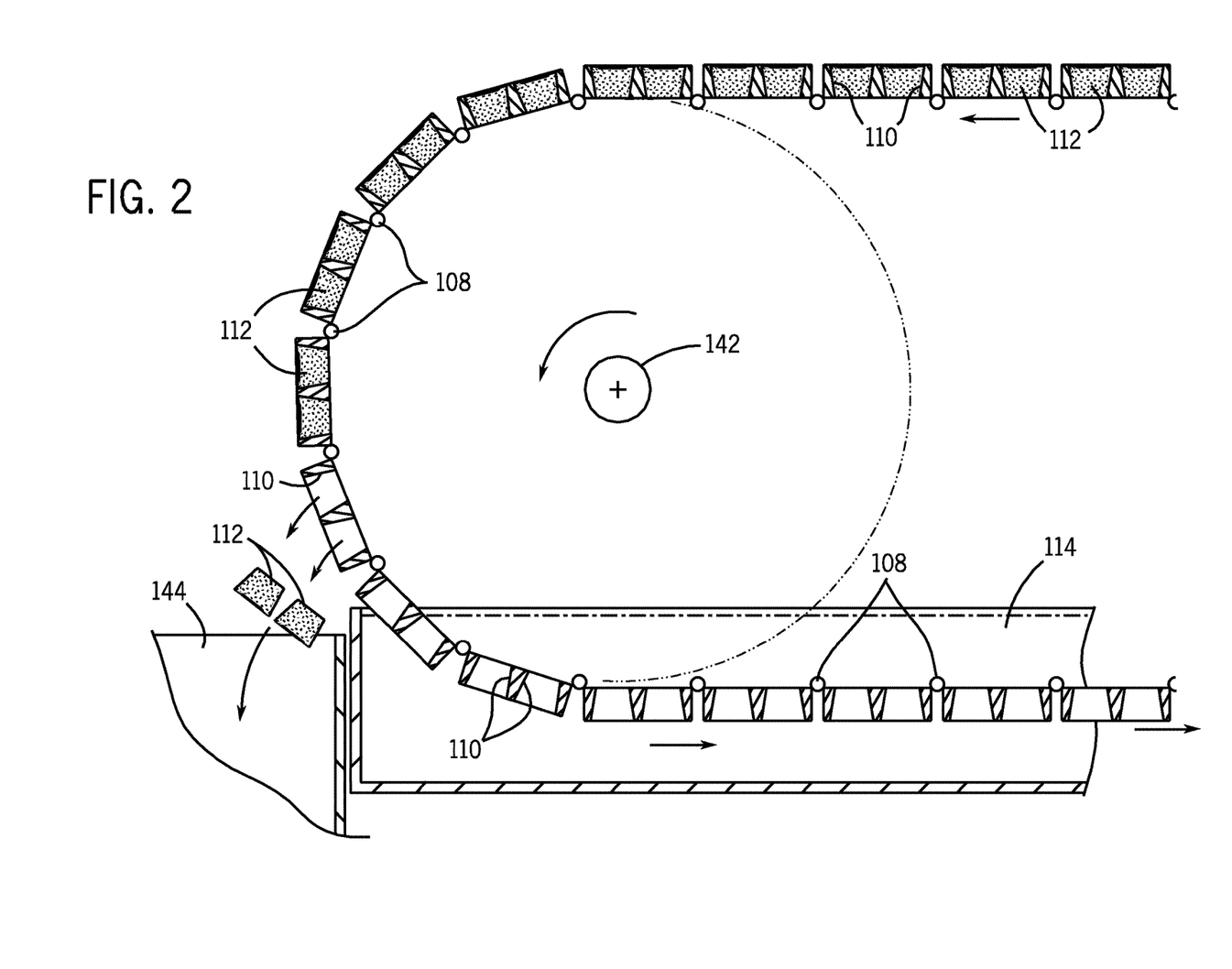
FIG. 2 is a partial cross-sectional view of a portion of the endless conveyor of the system illustrated in FIG. 1, illustrating ejection of a pellet from a cavity.
Figure 7:
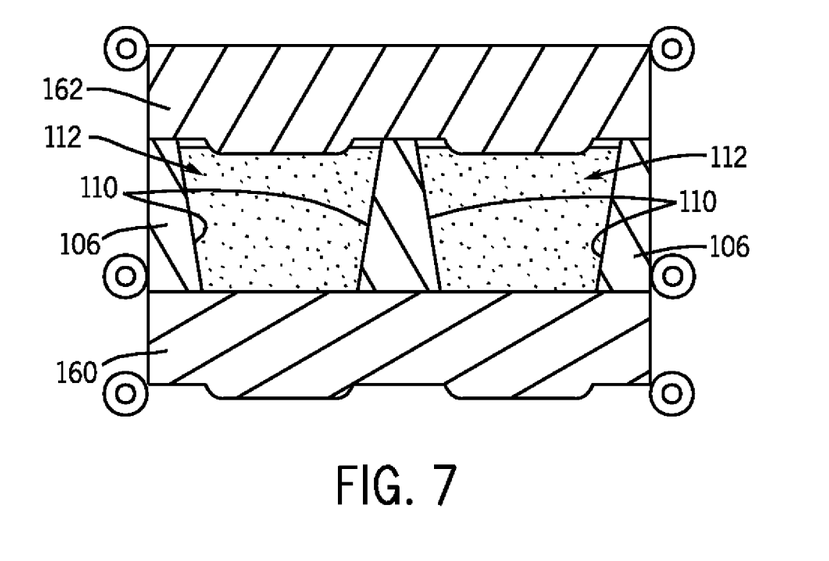
FIG. 7 is a schematic side cross-sectional view of a portion of the endless conveyors illustrated in FIG. 1, defining cavities between a lower endless conveyer conduction bar and an upper endless conveyer conduction bar.

The cavities 110 are defined in the conveyor 106 belt itself (FIGS. 1, 2, and 7). The material defining the cavity is typically composed of metal such as stainless steel and in some instances is a two-part structure with a pivot or hinge aligned along a flexline 111 that allows a pellet 112 contained in the cavity 110 to be removed from the cavity 110 at a dispensing station by flexing the conveyor as the conveyor moves around a pivot 142.

Figure 6:
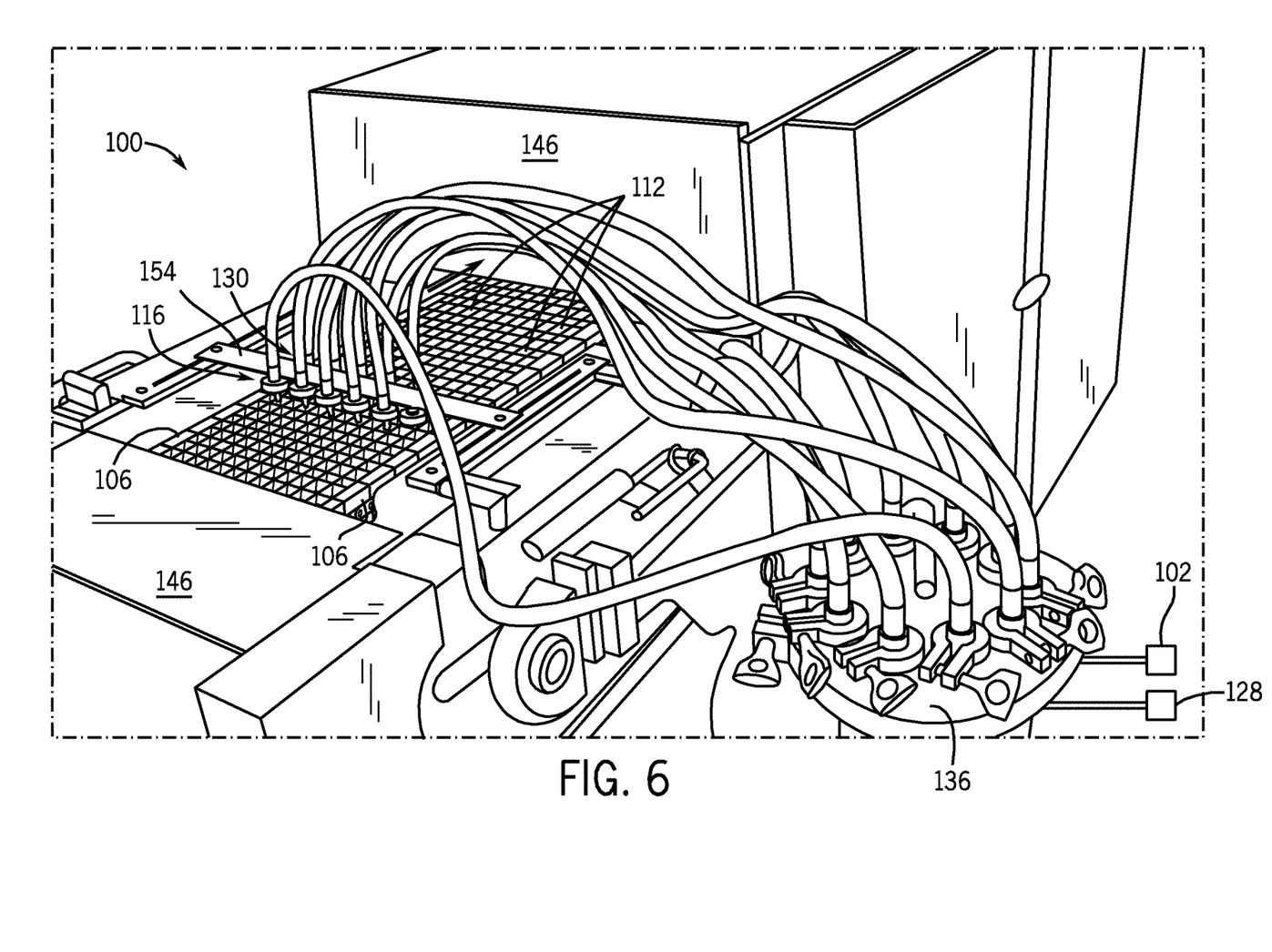
FIG. 6 is an isometric view of a portion of the system illustrated in FIG. 5, showing a distribution manifold and two food supply chambers.

The system 100 includes a housing 146 which is configured to enclose the conveyor 106 and quick freeze apparatus 114. The figures do not show complete enclosure so that certain features of the system 100 can be illustrated. FIGS. 1 and 6 illustrate two embodiments of the nozzle support structure 154. In each embodiment the plurality of nozzles 116, 130, and 150 are configured to extend traversely over the cavities 110 of the conveyor 106. At least one nozzle 104 is positioned over each cavity 110 in the conveyor 106. As explained below, a nozzle 104 may have multiple discharge chambers 138, 140.

In other embodiments the system 100 will have a plurality of nozzles aligned serially (See FIG. 1) to deposit a food product in a select cavity in sequence. For example, in FIG. 1, the first plurality of nozzles 116 deposits a solid food product, a predetermined amount of food 122, the second plurality of nozzles 130 deposits a second predetermined amount of food 132 (a viscous food product) into the same cavity as the conveyor 106 moves, the conveyor continues to move and a third plurality of nozzles 150 deposits a solid food product, a predetermined amount of food 152 into the same cavity, which creates the pellet 112. It should be understood that the type of food product deposited can vary as determined by the user or operator of the system 100.

The nozzles 110 do not touch the cavity walls or other parts of the conveyor 106. In contrast to the prior art (See U.S. Pat. No. 6,408,639) which scrapes across the conveyor 6 and creates flash on the conveyor 6, the present disclosure does not create flash and controls the amount of food product deposited in each cavity 110 by weight and volume to eliminate waste. It should be understood that any combination of nozzles 104 can be configured for a given system, for example, only one food product can be deposited in all of the cavities. In another example, two different types of food product, solid and viscous, can be deposited in the same cavity, either from the same nozzle (See FIGS. 5 and 6) or from different serial nozzles.

This application discloses a system for metering disposition of food product 100 that includes three separate independently operated conveyors. An endless conveyor 106 that, as described above defines the cavities 110 into which the food product is deposited and wherein the pallets 112 are formed. The endless conveyor 106 includes a lower portion 164 and an upper portion 166. The endless conveyor 106 moves within the system housing 146. The housing 146 also includes a quick freeze apparatus 114 in which liquid nitrogen is contained. The quick freeze apparatus 114 includes a lower quick freeze section 156 through which a portion of the endless conveyor 106 moves and its temperature is reduced to a predetermined temperature for freezing the food product that is deposited in the cavities 110.

This system 100 also includes a lower endless conduction bar conveyor 160 which is configured to align and contact the lower portion 164 of the endless conveyor 106. The lower endless conduction bar conveyor 160 also is immersed in the liquid nitrogen in the quick freeze apparatus 114 as the lower endless conduction bar conveyor 160 moves through the lower quick freeze section 156. The lower endless conduction bar conveyor 160 is configured to align with the endless conveyor 106 before a food product is deposited into the cavities defined in the endless conveyor 106. Upon depositing of the food product, for example a predefined amount of food 102 is deposited into the cavity 110 all of the lateral sides of the food product begin to freeze in the cavity 110 and the bottom of the food product begins to freeze on contact with the lower endless conduction bar conveyor 160. As the two endless conveyors 106 and 160 move within the system housing 146 a third conveyor, the upper endless conduction bar conveyor 162 aligns and contacts the upper portion of the endless conveyor 106 on each cavity 110.

The upper endless conduction bar conveyor 162 moves through an upper quick freeze section 158 of the quick freeze apparatus 114. The upper quick freeze section 158 includes a liquid nitrogen bath that reduces the temperature of the upper endless conduction bar conveyor 162 to a predetermined temperature. Upon the alignment and contacting of the upper endless conduction bar conveyor 162 with the top of the upper portion of the endless conveyor 166 on each cavity 110 all surfaces of the food product in each cavity 110 begins to freeze into individual quick frozen pellets. The schematic diagram of FIG. 1 illustrates the three conveyors 106, 160, and 162 and it should be understood that the entire apparatus is enclosed in a housing of the quick freeze apparatus 114.

It is contemplated that much of the liquid nitrogen used to reduce the temperature of the various portions of the conveyors will be used to lower the temperature of the material of which the conveyors are composed to quick freeze the food product in the cavities 110. The system is configured to recover any liquid nitrogen vapor that is expelled during the process with the vapor being used as additional refrigerant for the quick freeze process disclosed herein.

One benefit of this triple contact process is producing a higher through-put of quick freeze individual pellets within the same physical space of a non-triple contact freezing operation. The molding section of the system 100 uses both convection and conduction heat transfers. The metal plates, i.e. the conduction bars of the upper and lower conduction bar conveyors 160, 162 are cooled most effectively using convection heat transfer by moving the metal plates through the liquid nitrogen of a quick freeze apparatus 114. The heat transfer that occurs between the endless conveyor 106 and the lower and upper endless conduction bar conveyors 160, 162 is a conductive heat transfer. It is found that the transfer of energy between the surface of the sauce in the conductive plates is an efficient conductive transfer of energy.

The disclosed system 100 results in an individually quick frozen pellet of food product that is one of a specific volume and a specific weight without waste or flash deposited on the several conveyors used in the system. Also, for its given size, more food product is processed through the system 100 utilizing the triple contact configuration disclosed herein.

The removal of the food product pellet 112 from the cavity 110 typically occurs at the end of the fill conveyor line and deposited in a bin or onto another conveyor system for further processing, for example packaging (See FIG. 2).

The filling of the cavities 110 of the food product 122, 132, and 152 occurs in such a manner that the food product is only filled to the molds without having any product deposited outside of the mold cavities or between the mold cavities as flash. With the present disclosure, there is no need for the food product supply chamber 102 or scrape apparatus to swipe across the conveyor as is typically required in the prior art. It should be understood that a pellet 112 can be configured in any desired shape which is controlled by the shape of the cavity 110 into which the food product is deposited and the amount of food product deposited.

With the present process and system, the filling of a mold or the mold cavity 110 with food product 122, 132, 152 can create exact weight pieces in each of the cavities 110 of the mold. Such arrangement is desirable for a product which may be dispensed by count at the end use, for example the packaging process, with a specific combined weight of the food product. For example if the end product was to contain a one pound package of a specific type of food product pellet 112, with the present process and system, 16 cavities can be filled with 16 1-oz. disposition of food products from the food supply chamber 102 into each cavity 110 creating a pellet 112. Such pellets typically are quick frozen such that at the end of the filling conveyor the cavities are emptied of the 16 pellets and the 16 pellets can be further processed, for example additional freezing, or packaged into the desired 1 lb. package, for example a bag. Since there would be no flash associated with this process and system, the conveyor 106 defining the cavities 110 would be in a condition for immediate continued use after reducing the conveyor temperature to a predetermined temperature since no flash or overfill would have to be cleaned or removed.

The present process and system also provides the ability to deposit different predetermined weight of food products in a predetermined portion of cavities 120, 124 in the conveyor. The different weight of the food product pellet 112 in the different portion of cavities, can be separated at the end of the fill conveyor line to provide flexibility in creating end user packaging with the different weighted pellets. Such purposeful difference in weight creates a statistically significant difference to allow a computerized combination or weighing scale the ability to better make exact dispensing weights of the frozen pellets into subsequent packages or meal kits of the specific food product.

In another embodiment, the process and system provides that a second quantity of food product 132 in a second supply chamber 128 having a second plurality of nozzles 130 are aligned over the conveyor containing the cavities. The second plurality of nozzles 130 are aligned with the predetermined portion of cavities 124 metering the second predetermined amount of food product 122 and dispensing the second quantity of food product through each of the second plurality of nozzles into the predetermined portion of cavities on top of the previously dispensed food product. In this embodiment, using more than one filler to provide a sequential style of fill allows multiple liquid ingredients to be layered into a final individual quick frozen pellet 112.

It is also contemplated, with the above-described embodiment, that the dispensing of a solid food product, for example a small carrot cube into a cavity prior to the liquid sauce in the second supply 128 chamber and nozzle system deposits the sauce into the same cavity as the carrot piece. Such arrangement encapsulates the carrot piece or pieces into a single pellet. It is also possible, with this embodiment, that the fluid sauce is deposited in the cavity first and then the solid piece of food product from the second supply chamber 128 is deposited on top of the first deposited food product. It is also understood that a third plurality of nozzles 150 dispensing a food product 152 from a third supply chamber 148 can be configured in the system 100.

The present system 100 provides for a quick freeze apparatus 114 coupled to the endless conveyor 106 defining the plurality of cavities 110.

The cavity is defined by angled walls, typically two cavity walls per unit. A lower endless conduction bar 160 couples to the cavity wall unit to form a bottom of the cavity and an upper endless conduction bar 162 couples to the cavity wall unit to form a top of the cavity. (See FIG. 7) The lower endless conduction bar 160 and the endless conveyor 106 with the cavity wall 110 unit is immersed in a lower quick freeze section 156 of the quick freezer apparatus 114 to reduce the temperature of the endless conveyor 106. The food product is deposited into the cavity wall 110 unit of the endless conveyor 106 and freezing of the food product begins (See FIG. 1).

As the conveyor with food product 112 continues along, the upper endless conduction bar 160 contacts the food product 112 to begin freezing the top portion of the food. The upper endless conduction bar 160 is reduced in temperature in an upper quick freeze section 158 of the quick freeze apparatus 114. (See FIG. 1).

This system cryogenically refrigerates the conveyor belt 106 and the upper and lower conduction bars 162, 160 with a refrigerant, for example liquid nitrogen(which has a temperature between −196° C. and −210° C.), such that when the food product is deposited into the cavity the freezing of the food product into an individual quick frozen pellet 112 starts immediately upon disposition in the cavities 110. In one embodiment, the several portions 160, 162, 164, 166 of the endless conveyor 106 moves through the quick freeze apparatus 114 (See FIG. 1) for a time period sufficient to reduce the temperature of the conveyor 106 to a very low temperature (perhaps −150° C.).

Figure 8:
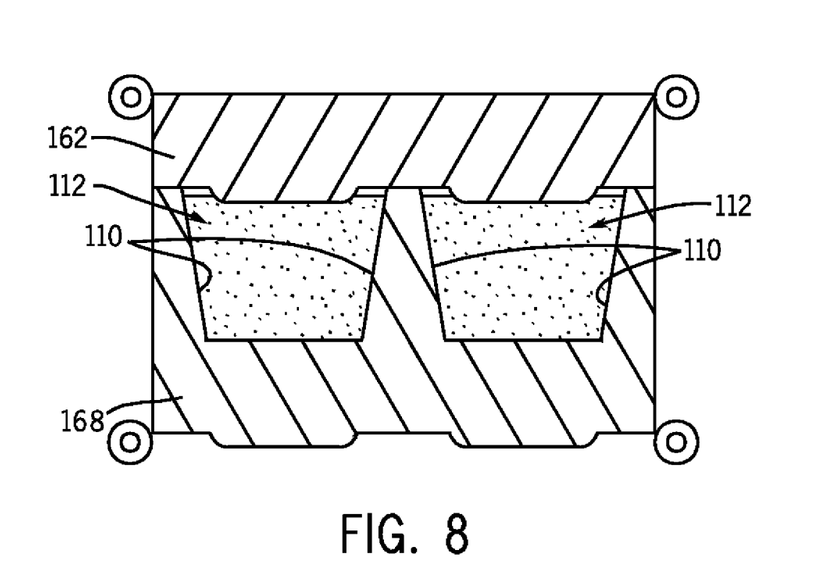
FIG. 8 is a schematic side cross-sectional view similar to the one illustrated in FIG. 7, showing an alternate embodiment in which the central conveyor and the bottom conveyor are merged into a single lower conveyer.

Referring finally to FIG. 8, the conveyor 106 and the lower endless conduction bar conveyor 160 are shown as having been merged into a single conveyor 168 having the cavities 110 enclosed by both side walls and a bottom wall.

In this embodiment, the upper endless conduction bar conveyor 162 (shown in FIG. 1 would be used in conjunction with the conveyor 168.

It should be understood that a final hard freeze does not occur to the entire pellet until it is discharged from the pellet portion of the freezer and then goes through a more traditional belt freezer to get the core fully frozen. However, edge freezing of the food product, that portion of the food product in immediate contact with the material defining the cavity, occurs on contact of the food product with the edge of the cavity. This freezing progresses towards the core of the pellet, while further freezing occurs to the pellet due to gaseous nitrogen being introduced to the pellet in some configurations. Conduction on the sides of the cavity also tends to freeze the food product upon disposition of the food product into a cavity.

Figure 3:
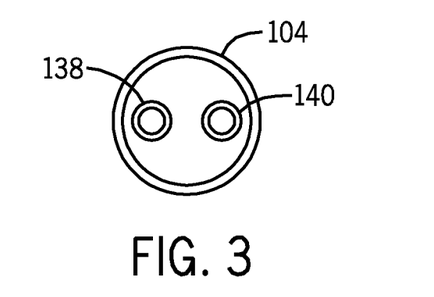
FIG. 3 is an end view of a nozzle configured with two discharge chambers aligned side-by-side.
Figure 4:
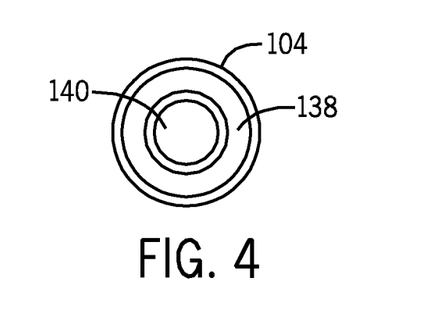
FIG. 4 is an end view of a nozzle configured with two discharge chambers aligned concentrically.
Figure 5:
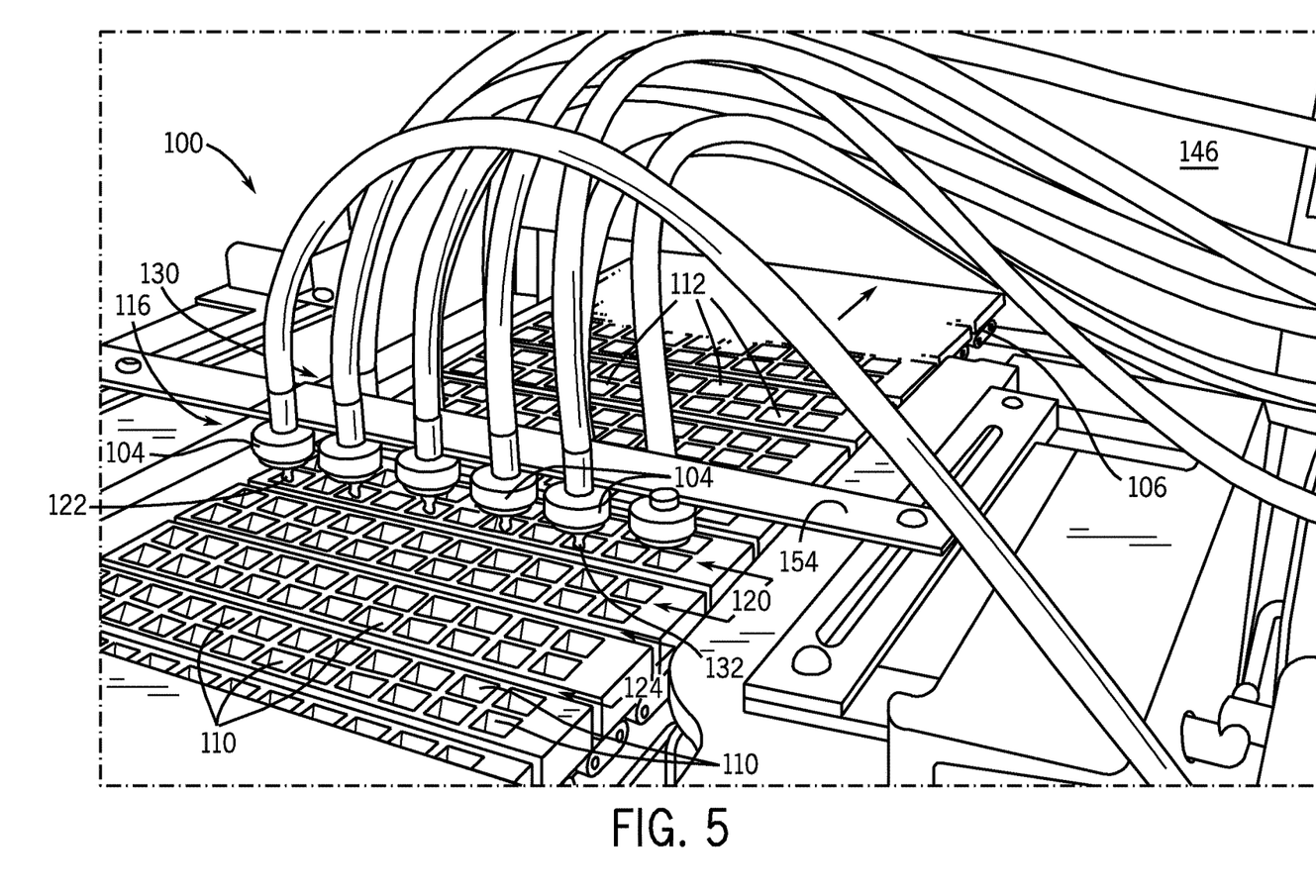
FIG. 5 is an isometric view of a portion of the system illustrated in FIG. 1.

In another embodiment, each of the nozzles 104 includes at least two separate discharge chambers 138, 140 with each chamber in communication with one of a quantity of food products 102, 128. In one configuration, the two discharge chambers 138, 140 are aligned side by side (FIG. 4) and in another configuration the two discharge chambers are aligned concentrically (FIG. 5). Such nozzles are configured to dispense the two quantities of food product simultaneously through the same plurality of nozzles into the predetermined portion of cavities on or in the conveyor 106. Such simultaneous discharge of the food products into the same cavity provides a marbling effect. A distribution manifold 136 is coupled to the food supply chambers 102, 128, 148 and facilitates distribution to the predetermined nozzles for dispensing of the food product. Appropriate pumps, conduits, tubes and related equipment are coupled to the distribution manifold 136. An exemplary distribution manifold is illustrated in FIG. 3. The distribution manifold 136 can be any suitable and convenient mechanism configured to distribute the food product to the desired nozzles.

It should be understood that any number of supply chambers can be coupled to the manifold 136 and provide food product above a conveyor 106 in dispensing different food products into different portions of cavities 120, 124 moving underneath the nozzles. This allows an operator to fill different mold cavities with different combinations of food products within different molds as determined by the operator. The disposition of the food product through the plurality of nozzles 104 can be by gravity or under pressure, such as a spray liquid filler in combination with either a liquid filler or solid filler. A valve apparatus is associated with each nozzle to control the predetermined amount of food product disposed into a cavity.

It is also contemplated that the system and process can be controlled by a controller coupled to the system that controls the amount, weight, combination of food products being deposited in specific cavities or groups of cavities as determined by an operator.

It is contemplated, the process and system of the present disclosure provides that the quantity of food product can be one of a solid food product or a viscous food product. For example, the food product can be one of a cheese sauce, a vegetable sauce, and a meat sauce. For further example, an individual quick frozen pellet can be a homogenous pellet of each sauce to give a blend of marinara, parmesan, and a garlic sauce in a machine at the end of the filler conveyor.

The present process and system 100 for metering the disposition of the food product into cavities 110 to form a pellet 112 provides the ability to create exact weight pellets, create exactly random weight pellets to improve filling accuracy with a computerized combinational weighing scale. The process and system 100 also provides for the creation of pellets 112 with both viscous and nonviscous food products and to create food pellets with multiple liquid and solid ingredients.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present process and system has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations as described herein may be made, none of which depart from the spirit or scope of the present disclosure. The particular embodiments and applications were chosen and described to provide the best illustration and its practical application to thereby enable one of ordinary skill in the art to utilize the disclosure in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. A process for metering the disposition of a food product into cavities for forming a pellet, the cavities are defined in an endless conveyor as individual cavities, with each cavity defining a specific volume and defined by a two part structure and with the endless conveyor having a lower portion and an upper portion, the process comprising:
supplying a quantity of food product in a supply chamber, wherein the supply chamber includes a plurality of nozzles aligned above the conveyor;
aligning a lower endless conduction bar conveyor with and contacting a lower portion of the endless conveyor at each cavity;
reducing the temperature of the conveyor and the lower endless conduction bar conveyor to a predetermined temperature in a lower section of a cryogenic refrigeration apparatus;
aligning the plurality of nozzles with a predetermined portion of the cavities;
metering a predefined amount of the supply of food product dispensed through each nozzle;
dispensing the food product through one of the nozzles into one of the cavities without exceeding the specific volume of the cavity;
aligning an upper endless conduction bar conveyor with and contacting an upper portion of the endless conveyor on each cavity;
reducing the temperature of the upper endless conduction bar conveyor to a predetermined temperature in an upper section of the cryogenic refrigeration apparatus; and freezing all surfaces of the food product into an individual quick frozen pellet starting immediately upon contact of the upper endless conduction bar conveyor with one of the cavities in the endless conveyor.

2. The process for metering the disposition of a food product of claim 1, further comprising the step of metering to include a predetermined weight of the food product.

3. The process for metering the disposition of a food product of claim 2, wherein each cavity of the predetermined portion of the cavities receives a different predetermined weight of the food product.

4. The process for metering the disposition of a food product of claim 1, further comprising supplying a second quantity of food product in a second supply chamber having a second plurality of nozzles, aligning the second plurality of nozzles with the predetermined portion of the cavities, metering the second predefined amount of food product, and dispensing the second quantity of food product through each of the second plurality of nozzles into the predetermined portion of cavities on top of the previously dispensed food product.

5. The process for metering the disposition of a food product of claim 4, wherein the second quantity of food product is one of a solid food product and a viscous food product.

6. The process for metering the disposition of a food product of claim 1 wherein the quantity of food product is one of a solid food product and a viscous food product.

7. The process for metering the disposition of a food product of claim 1, further comprising supplying a second quantity of food product in a second supply chamber in communication with the plurality of nozzles aligned above the endless conveyor with the plurality of nozzles configured to dispense both quantities of food product simultaneously through the same plurality of nozzles into the predetermined portion of cavities.

8. The process for metering the disposition of a food product of claim 7, wherein each nozzle of the plurality of nozzles comprises two separate discharge chambers with each chamber in communication with one of the quantity of food products.

9. The process for metering the disposition of a food product of claim 8, wherein the two discharge chambers are aligned side-by-side.

10. The process for metering the disposition of a food product of claim 8, wherein the two discharge chambers are aligned concentrically.

11. The process for metering the disposition of a food product of claim 1, further comprising supplying a second quantity of food product in a second supply chamber having a second plurality of nozzles, aligning the second plurality of nozzles with a second predetermined portion of the cavities, metering the second predefined amount of food product, and dispensing the second quantity of food product through each of the second plurality of nozzles into the second predetermined portion of cavities.

12. The process for metering the disposition of a food product of claim 1, wherein the food product is one of a cheese sauce, vegetable sauce, and a meat sauce.

* * * * *